(12) United States Patent
Rajasekharan et al.

(10) Patent No.: US 9,093,098 B2
(45) Date of Patent: Jul. 28, 2015

(54) SLIDER WITH SHOCK DAMPING FEATURES

(71) Applicant: SEAGATE TECHNOLOGY LLC, Cupertino, CA (US)

(72) Inventors: Ajaykumar Rajasekharan, Bloomington, MN (US); Narayanan Ramakrishnan, Bloomington, MN (US); James Ronald Krolnik, Brooklyn Park, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/708,730

(22) Filed: Dec. 7, 2012

(65) Prior Publication Data

US 2014/0192440 A1 Jul. 10, 2014

(51) Int. Cl.
*G11B 5/60* (2006.01)
*G11B 21/21* (2006.01)

(52) U.S. Cl.
CPC ............ *G11B 5/6005* (2013.01); *G11B 5/6082* (2013.01); *G11B 21/21* (2013.01)

(58) Field of Classification Search
CPC .............................. G11B 5/6005; G11B 21/21
USPC .......... 360/235.5, 235.8, 236.1, 236.2, 236.3, 360/236.5–236.9, 237
See application file for complete search history.

(56) References Cited

U.S. PATENT DOCUMENTS

| | | | |
|---|---|---|---|
| 4,802,042 A | 1/1989 | Strom | |
| 5,309,303 A * | 5/1994 | Hsia et al. | 360/236.1 |
| 5,636,085 A | 6/1997 | Jones et al. | |
| 5,973,881 A * | 10/1999 | Ajiki | 360/235.8 |
| 6,937,440 B2 * | 8/2005 | Rajakumar et al. | 360/236.2 |
| 6,989,965 B2 * | 1/2006 | Mundt et al. | 360/235.4 |
| 7,099,114 B2 * | 8/2006 | Kang | 360/235.6 |
| 7,123,449 B2 * | 10/2006 | Kang | 360/235.8 |
| 7,477,486 B1 | 1/2009 | Sun et al. | |
| 8,116,037 B2 * | 2/2012 | Kohira et al. | 360/235.7 |
| 8,320,082 B2 * | 11/2012 | Hanyu | 360/236.2 |
| 8,611,051 B1 * | 12/2013 | Hanyu | 360/236.3 |
| 2004/0156143 A1 * | 8/2004 | Kang | 360/235.8 |

* cited by examiner

*Primary Examiner* — Angel Castro
(74) *Attorney, Agent, or Firm* — Hall Estill Attorneys at Law (57) ABSTRACT

An apparatus and associated methodology contemplating a slider body defining longitudinal extents at a leading end and a trailing end. A fluid bearing surface is formed in part by a side rail extending substantially longitudinally along the slider body and joined to a cross rail extending substantially laterally along the slider body. The side rail and the cross rail define at least a portion of a positive pressure recess. A vent is defined in the fluid bearing surface that is in fluid communication with ambient pressure fluid on one side of the side rail but is not in fluid communication with the positive pressure recess on the other side of the side rail.

20 Claims, 11 Drawing Sheets

SLIDER WITH SHOCK DAMPING FEATURES

SUMMARY

Embodiments of the present invention contemplate an apparatus having a slider body defining longitudinal extents at a leading end and a trailing end. A side rail has a first surface extending substantially longitudinally along the slider body, and is joined to a cross rail having a second surface extending substantially laterally along the slider body. The first and second surfaces define at least a portion of a positive pressure recess. A cavity is defined in the side rail that does not intersect the first surface but does intersect another longitudinal surface of the side rail opposing the first surface.

Embodiments of the present invention contemplate a method including obtaining a slider having a slider body defining longitudinal extents at a leading end and a trailing end, the slider further having a side rail including a first surface extending substantially longitudinally along the slider body and joined to a cross rail including a second surface extending substantially laterally along the slider body, the first and second surfaces defining at least a portion of a positive pressure recess, and the slider having a cavity in the side rail that does not intersect the first surface but does intersect another longitudinal surface of the side rail opposing the first surface; and flying the slider apart from a medium upon fluid currents created by moving the medium.

Embodiments of the present invention contemplate an apparatus having a slider body defining longitudinal extents at a leading end and a trailing end. A fluid bearing surface is formed in part by a side rail extending substantially longitudinally along the slider body and joined to a cross rail extending substantially laterally along the slider body. The side rail and the cross rail define at least a portion of a positive pressure recess. A vent is defined in the fluid bearing surface that is in fluid communication with ambient pressure fluid on one side of the side rail but is not in fluid communication with the positive pressure recess on the other side of the side rail.

DETAILED DESCRIPTION

Disc storage devices store digitally encoded information on data storage discs. Heads read data from or write data to the discs which are, in turn, rotated by a motor. Heads include transducer elements, such as magnetoresistive, magneto-optical or inductive elements for read or write operations. An actuator assembly moves the head relative to selected data tracks on the disc to transfer data.

Typically, the head includes a slider which is coupled to a head suspension assembly. Rotation of the disc creates a fluid flow that impinges aerodynamic features on the slider designed to produce a pressure profile that is sufficient to create a desired lift force. The lift force is countered by a load force from the suspension assembly. The resulting balance of these offsetting forces produces a desired fly height of the slider from the surface of the disc 106. The nominal fly height may be altered when the disc storage device is affected by an external shock event, such as dropping or abruptly jarring the disc drive storage device. Such an operational shock can result in head-disc contact, possibly leading to loss of performance or even worse, the loss of stored data or the capability to store data. The need to prevent head-disc contact is further exacerbated by the fact that the heads are flown at extremely small fly heights.

An operational shock imparted to a disc drive typically results in an impulse excitation; that is, a sudden load for a short period of time. The structural damping of the disc drive chassis and the mounting system results in reducing the magnitude of the impulse by spreading the impulse over time. This impulse excitation is eventually transmitted to the slider at a dimple point, causing a deflection that squeezes out the air between the slider and the disc. As a result, the slider undergoes alternating loads of high and low pre-loads, pitch-torques, and roll-torques. Failures can thus be attributed to trailing edge (TE) roll-off during the positive loading condition and leading edge (LE) slap-down during the negative loading condition.

Operational shocks may be a severely limiting factor for reliable performance of recording heads in applications where external shock events may occur, because the extremely low fly heights result in increased likelihood that head-disc contact can occur during operational shock events. Embodiments directed to improving shock robustness, particularly in the critical regime of short pulse-width shock inputs, are herein described.

Figure 1:
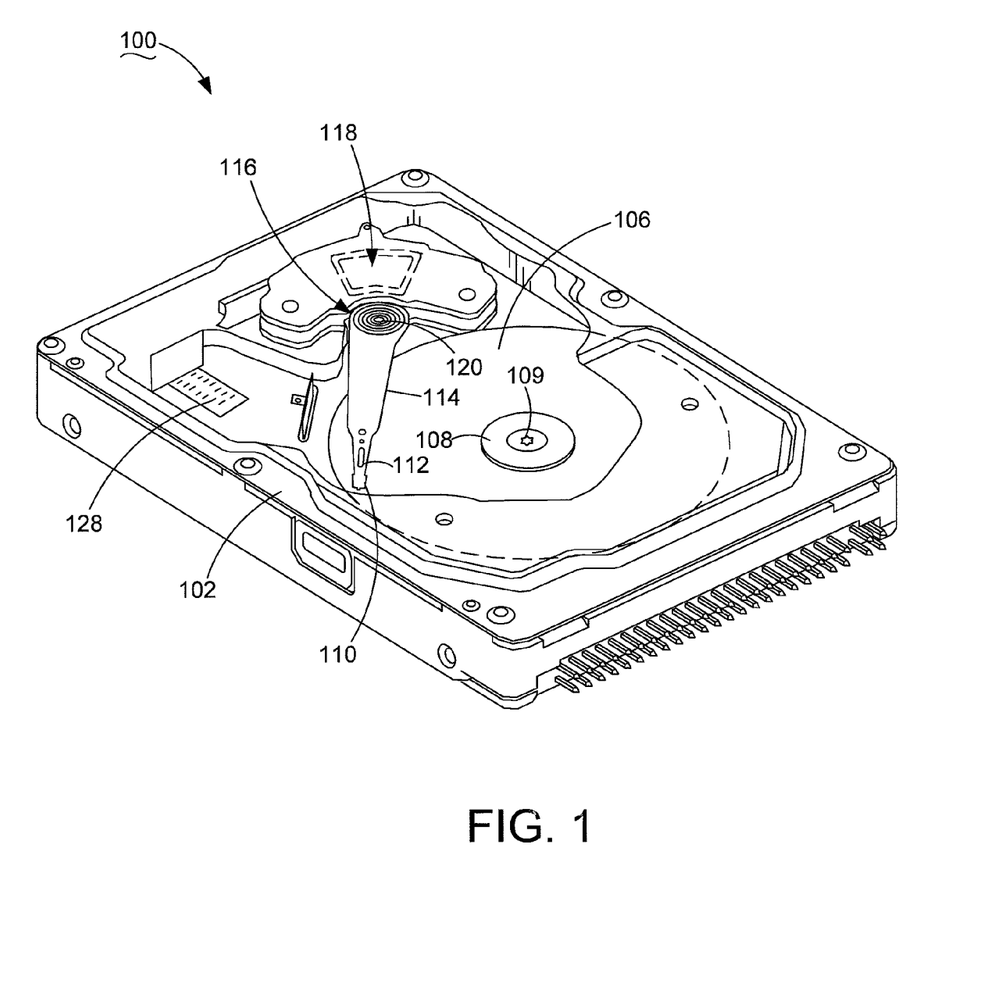
FIG. 1 is an isometric depiction of a data storage device constructed in accordance with embodiments of the present invention.

FIG. 1 is an isometric depiction of a data storage device characterized as a disc drive 100 in which embodiments of the present invention are useful. Use of the disc drive 100 in this description is illustrative and not enumerative of or in any way limiting of the claimed subject matter. In these illustrative embodiments the disc drive 100 can be a magnetic disc drive, an optical disc drive, a magnetic-optical disc drive, and the like.

Disc drive 100 includes a base 102. Disc drive 100 further includes one or more disc(s) 106 mounted for selected rotation on a spindle motor 109 by a disc clamp 108. Each disc 106 has a recording surface that is associated with a mating head 110 in a data transfer relationship therewith. In the illustrative embodiments depicted in FIG. 1, each head 110 is supported by a suspension assembly 112 which is, in turn, attached to a track accessing arm 114 of an actuator 116. The actuator 116 shown in FIG. 1 is of the type known as a rotary moving coil actuator and includes a voice coil motor (VCM), shown generally at 118. Voice coil motor 118 rotates actuator 116 with its attached head 110 around a pivot shaft 120 to position the head 110 along an arcuate path between a disc innermost data track and an outermost data track. Voice coil motor 118 is driven by servo electronics 128 based on signals generated by the head 110 reading servo data formatted to the disc 106. Each head 110 has a fluid bearing slider surface (or "slider"). High speed rotation of the discs 106 generates an outwardly spiraling flow of the operating fluid (such as air, helium, and the like) surrounding the discs 106. Each head 110 is aerodynamically lifted by the fluid stream impinging against the slider to fly the head 110 a small distance away ("fly height") from the recording surface of the respective disc 106.

Figure 2:
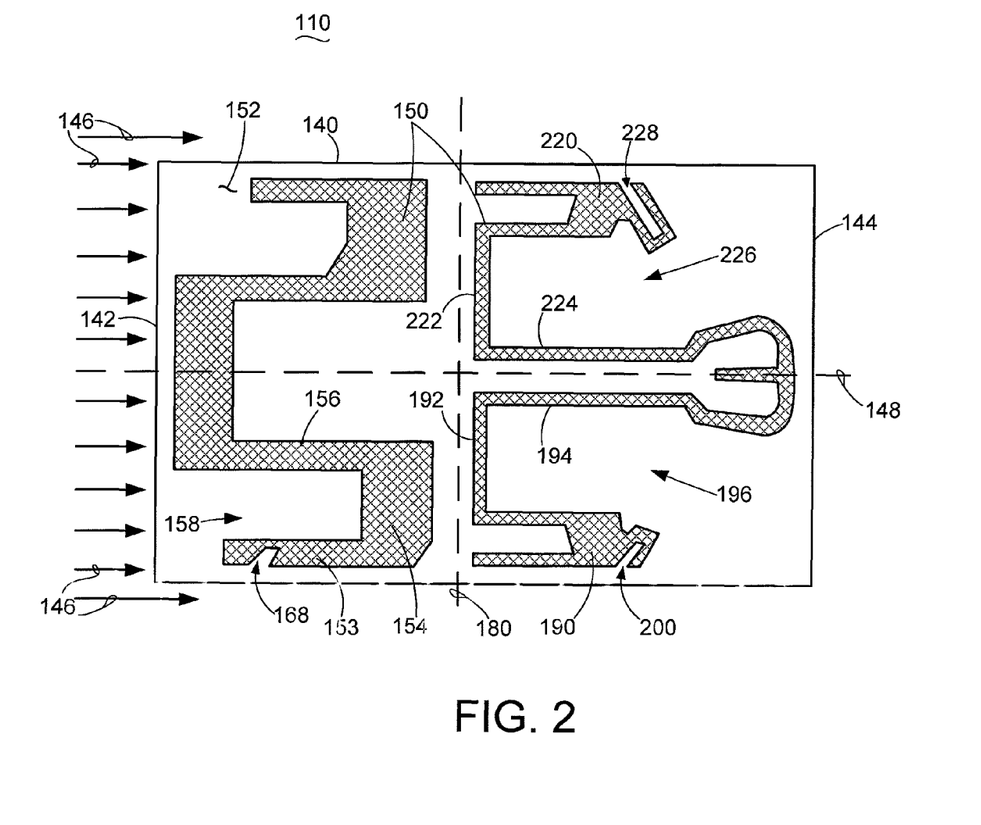
FIG. 2 is a diagrammatic plan depiction of the slider in the data storage device of FIG. 1 constructed in accordance with embodiments of the present invention.

FIG. 2 is a diagrammatic depiction of the slider portion of the head 110 (the surface facing the respective disc 106) constructed in accordance with illustrative embodiments of the present invention. Generally, the slider is provided with aerodynamic features that enable flying the head 110 extremely close to the disc 106 so that short wavelength, high-frequency signals can be transduced across the small fly height to store and retrieve high density data on/from the disc 106.

The slider generally includes a structural body 140 which is generally a rectangular-shaped body 140 defining a leading end 142 and a trailing end 144 with respect to the direction of the fluid flow denoted by arrows 146. The ends 142, 144 define the longitudinal extents of the body 140 spanning a longitudinal axis 148.

An air-bearing surface ("ABS") 150 (denoted by hatching) extends from and substantially parallel to a surface 152 of the body 140. Part of the ABS 150 is formed by a side rail 153 extending substantially longitudinally along the body 140. Another contiguous part of the ABS 150 is formed by a cross rail 154 joined to the side rail 153 and extending substantially laterally along the body 140. Another rail 156 is joined to the end of the cross rail 154 and extends substantially longitudinally along the body 140. The rails 153, 154, 156 have side surfaces thereof jutting outward from the slider surface 152 to define a positive pressure recess 158. The positive pressure recess 158 is positively pressurized by the fluid flowing along the longitudinal rails 153, 156 in the direction 146 and then impinging against the cross rail 154, thereby generating a lifting force against the slider urging the head 110 away from the disc 106.

Figure 3:
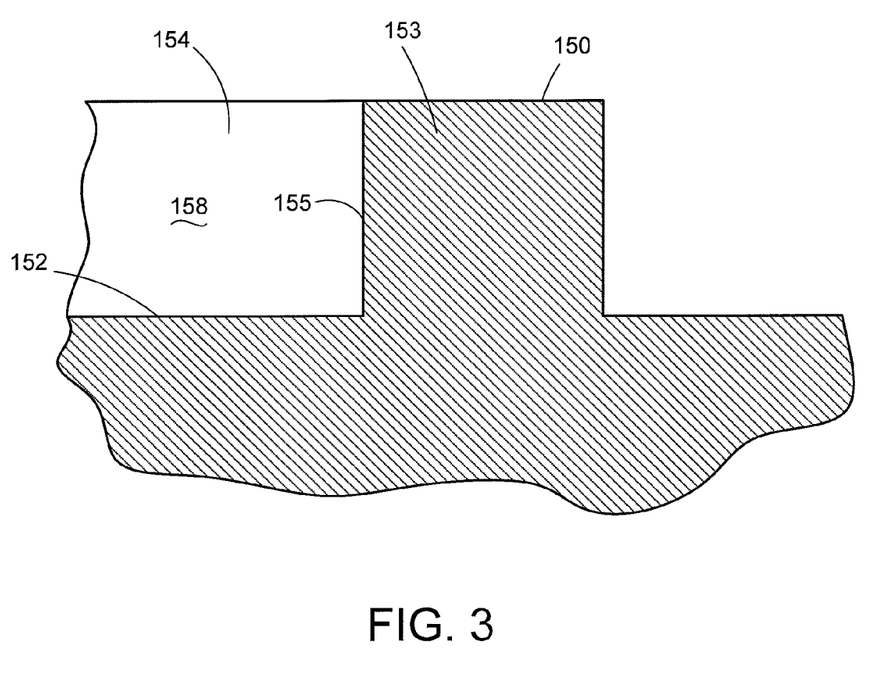
FIG. 3 is a cross-sectional depiction of a portion of the slider of FIG. 2 in accordance with embodiments of the present invention.
Figure 4:
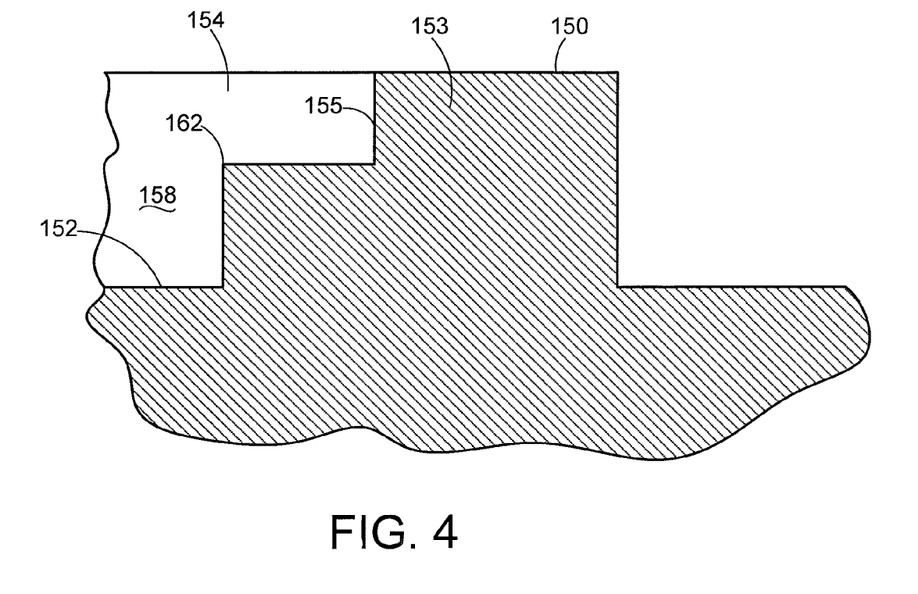
FIG. 4 is a cross-sectional depiction similar to FIG. 3 but depicting equivalent alternative embodiments of the present invention.
Figure 5:
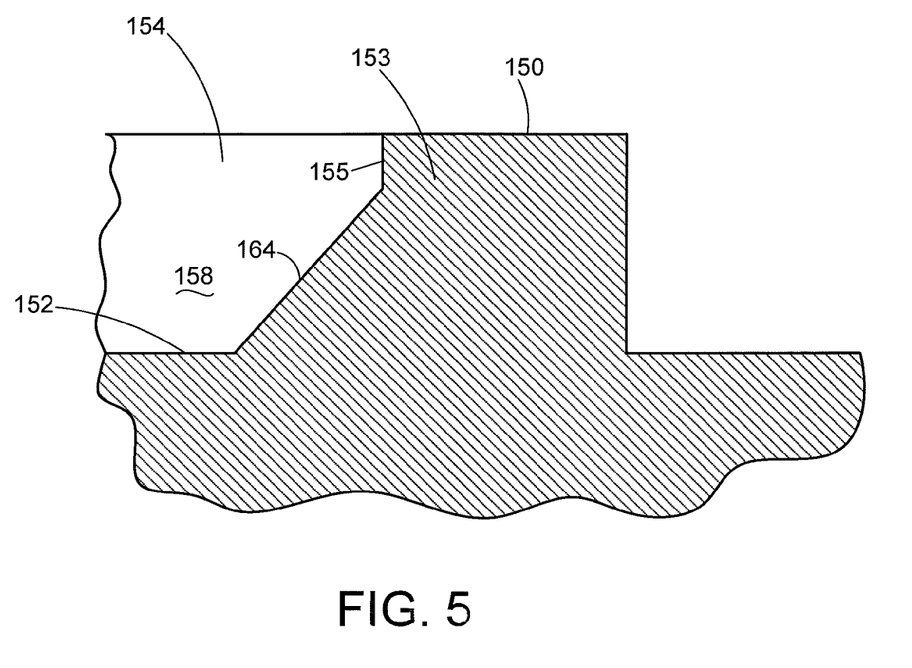
FIG. 5 is a cross-sectional depiction similar to FIG. 3 but depicting equivalent alternative embodiments of the present invention.

It will be appreciated that aerodynamic transition features can be provided to reduce turbulence created by the fluid currents flowing into and beyond the positive pressure recess 158. FIG. 3 depicts an enlarged cross-sectional view of the side rail 153 as described, generally having a surface 155 jutting outwardly, substantially perpendicularly, to the surface 152 of the body 140 and thereby partially forming the positive pressure recess 158. The sharp corner transition in these embodiments is more likely to generate turbulence than the square-stepped transition surface 162 of FIG. 4 or the angle-stepped transition surface 164 of FIG. 5.

With reference again to FIG. 2, rotation of the disc 106 directs the flow of fluid in the direction 146 from the leading end 142 toward the trailing end 144 of the slider. The fluid impinges against the ABS 150 to create a fluid bearing pressure profile which imparts a lifting force to the slider and, in turn, to the head 110. The lifting force is countered by a load force supplied via the suspension assembly 112 at a load point (about which the head 110 pitches and rolls) in contributing to defining a fly height of the head 110 adjacent the disc 106 surface. The ABS 150 is specifically designed to provide a pressure profile for a desired head-disc spacing in relation to both active and passive conditions. Active condition refers to the head 110 being acted upon in order to reduce and/or control variation in the fly height such as by thermal actuation or the like. Passive condition exists when the head 110 is not so actuated thermally or by some other means.

Figure 6:
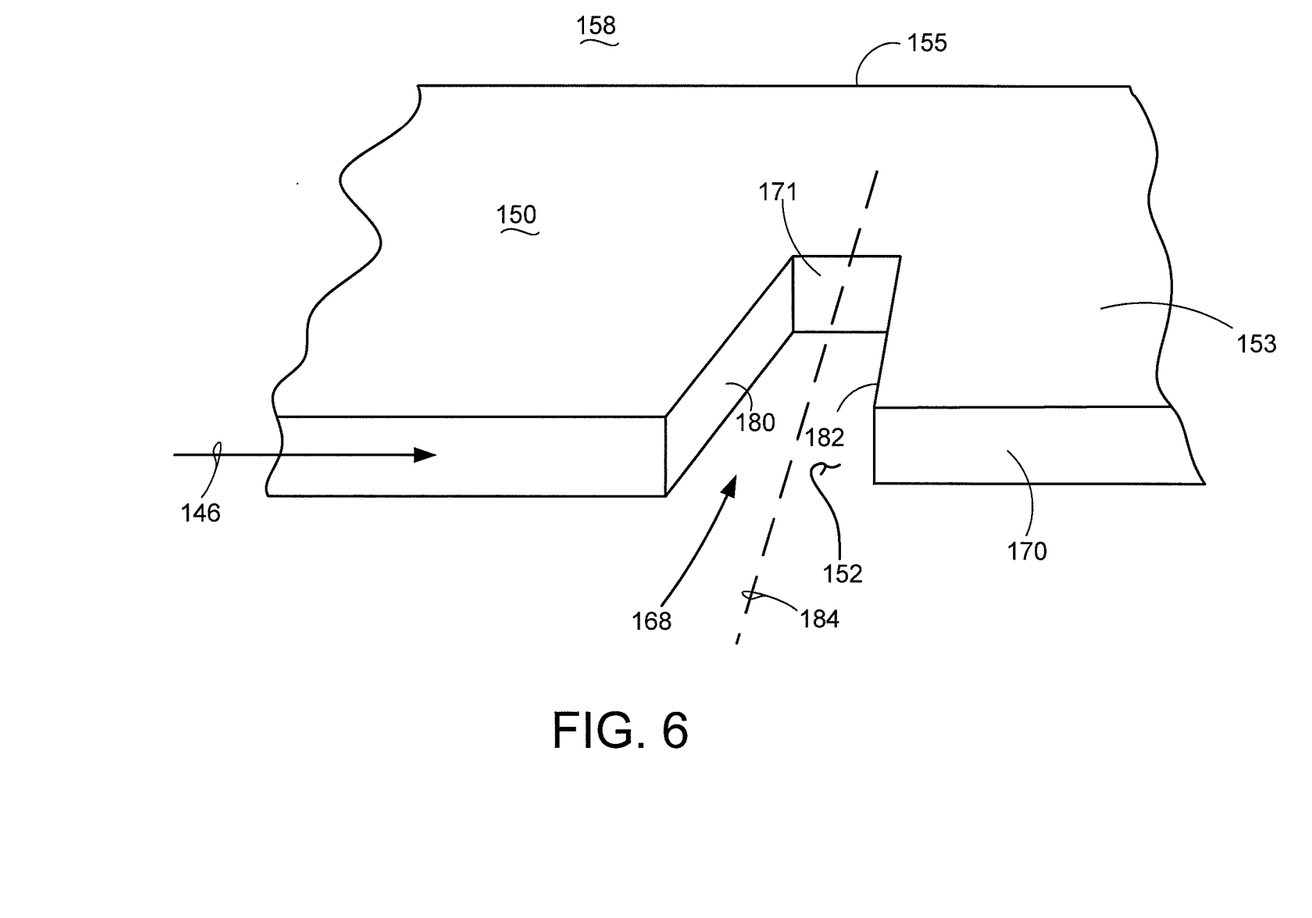
FIG. 6 is an isometric depiction of one of the cavities in the side rail of the slider in FIG. 2.

A cavity (also sometimes referred to as a "vent") 168 is formed in the side rail 153. In these illustrative embodiments the cavity 168 is located in the side rail 153 in the leading end portion of the slider; that is, between the leading end 142 and a midpoint axis 180 between the leading end 142 and the trailing end 144. FIG. 6 is an enlarged detail view of the cavity 168 that extends into the side rail 153, but which is formed in part by a closed end 171 such that the cavity 168 does not intersect the surface 155 of the side rail 153 forming part of the positive pressure recess 158. Note that in these embodiments the depth of the cavity 168 is consistently through the entire thickness of the side rail 153, such that the slider surface 152 forms the entire bottom of the cavity 168.

An opposing open end of the cavity 168 intersects another surface 170 of the side rail 153 opposing the surface 155, the surface 155 being nearer the longitudinal axis 148 than the opposing (in these embodiments substantially parallel) surface 170. The cavity 168 thereby fluidly communicates with ambient fluid, meaning fluid flowing in direction 146 but which does not impinge the side rail 153 and opposite the positive pressure recess 158. The ambient fluid is of a comparatively lower pressure than the fluid contained in the positive pressure recess 158. The cavity 168 does not fluidly communicate the comparatively higher pressure fluid in the positive pressure recess 158 with the ambient fluid through the side rail 153.

In these illustrative embodiments the cavity 168 is defined by non-parallel surfaces 180, 182 so that the open end is wider than the closed end. A central axis 184 angles the open end toward the oncoming ambient fluid flowing in direction 146 to facilitate introducing the ambient fluid into the cavity 168. Operational shocks (such as external excitation) alter the pressure profile created by the fluid flowing in direction 146 and impinging against the ABS 150. The result can be degraded performance or even damage done to the head 110 and/or the disc 106. The cavity 168 functions to dynamically pressurize the portion of the ABS 150 formed by the side rail 153. That advantageously damps the adverse effects of an operational shock by providing increased roll-off resistance, in the lift-off direction of the head 110, resulting from the external shock event. The damping feature is active only in response to a shock event, advantageously not adversely affecting the ABS 150 performance of the slider otherwise.

The optimal angular orientation of the central axis 184 is derived in relation to the nominal skew of the slider and the disc form-factor. The skew is a comparative offset between the longitudinal axis 148 and the tangent constructed to the selected data track with the head 110 positioned to write or read data to/from the data track. The skew varies across the different radial positions of the data tracks. The optimal angular orientation seeks to make as constant as possible the nominal fly, pitch and roll behavior across the range of skew values as the head 110 moves between the innermost and outermost storage tracks.

The longitudinal off-set of the cavity 168 with respect to the slider midpoint 180 affects the dynamic roll and pitch stiffness during an operational shock event. The longitudinal off-set distance, width(s) of the cavity 168, depth(s) of the cavity 168, and number of steps in the cavity 168 are all selected to optimize shock robustness in both the trailing edge roll-off mode and the leading edge slap-down mode.

Figure 7:
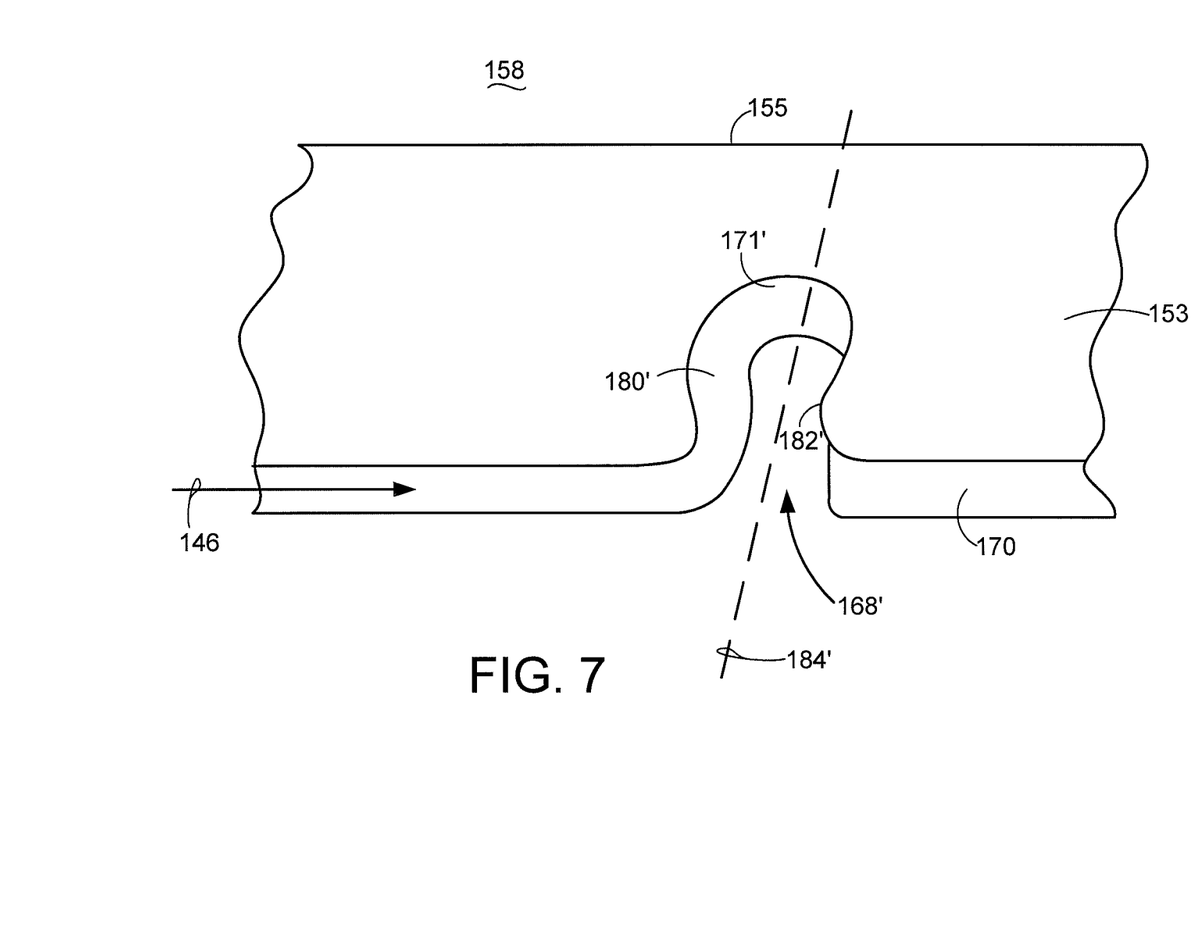
FIG. 7 is an isometric depiction similar to FIG. 6 but depicting equivalent alternative embodiments of the present invention.
Figure 8:
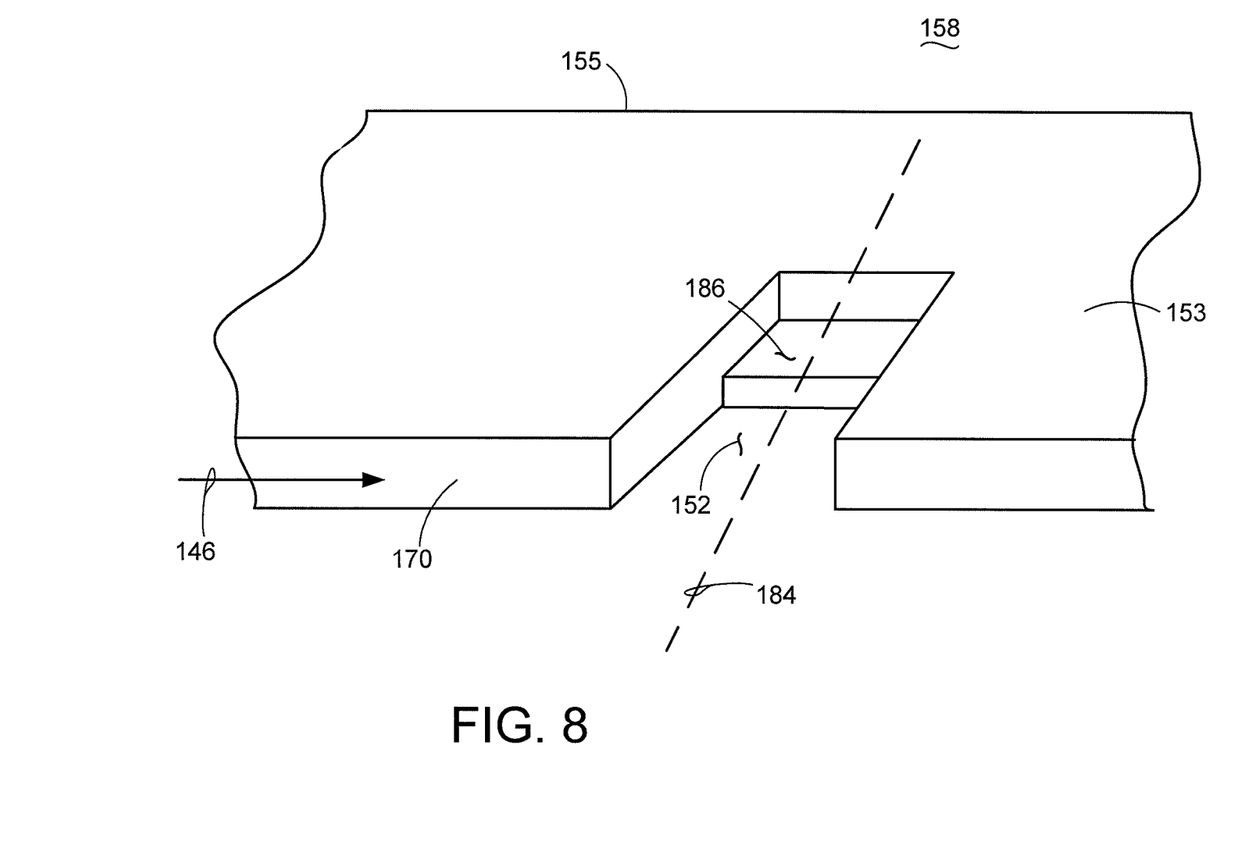
FIG. 8 is an isometric depiction similar to FIG. 6 but depicting equivalent alternative embodiments of the present invention.

FIG. 7 depicts embodiments similar to those of FIG. 6 but for the cavity 168' being defined by nonlinear surfaces 171', 180', 182'. In equivalent alternative embodiments (not depicted) the cavity 168 can be defined by a combination of linear surfaces like those depicted in FIG. 6 and nonlinear surfaces like those depicted in FIG. 7. FIG. 8 depicts other embodiments similar to those of FIG. 6 but for the depth of the cavity 168 being stepped by an intermediate surface 186 defining a more shallow depth than the slider surface 152. The stepped depth can advantageously diminish turbulence created by the ambient fluid flowing through the cavity, and as such can alternatively be constructed of arcuate or angled transitions surfaces such as those described regarding FIGS. 3-5 above. The difference in the depths of the plurality of the steps and the number of steps determine the magnitude of dynamic damping imparted to the head 110 in response to an excitation.

The lifting force on the leading end of the slider varies in moving radially across the disc 106, because the surface velocity of the disc is greater at outer diameters as compared to inner diameters. An effective way of compensating for this variation in lift force is to counter it with a self-loading negative pressure slider feature. Compensating changes between the positive and negative pressures on the slider result in most nearly providing a constant fly height across all disc track radii.

To that end, and returning to FIG. 2, in these illustrative embodiments a longitudinal side rail 190 forms another portion of the ABS 150 on the trailing end portion of the slider; that is, between the slider midpoint axis 180 and the trailing end 144. The side rail 190 is joined to another lateral cross rail 192 which, in turn, is joined to another longitudinal rail 194. The rails 190, 192, 194 have side surfaces thereof jutting outward from the slider surface 152 to define a negative pressure recess 196. The negative pressure recess 196 is negatively pressurized by the fluid flowing first past the cross rail 192 and then along the longitudinal rails 190, 194 in the direction 146, thereby generating a vacuum effect on the slider urging the head 110 toward the disc 106.

Figure 9:
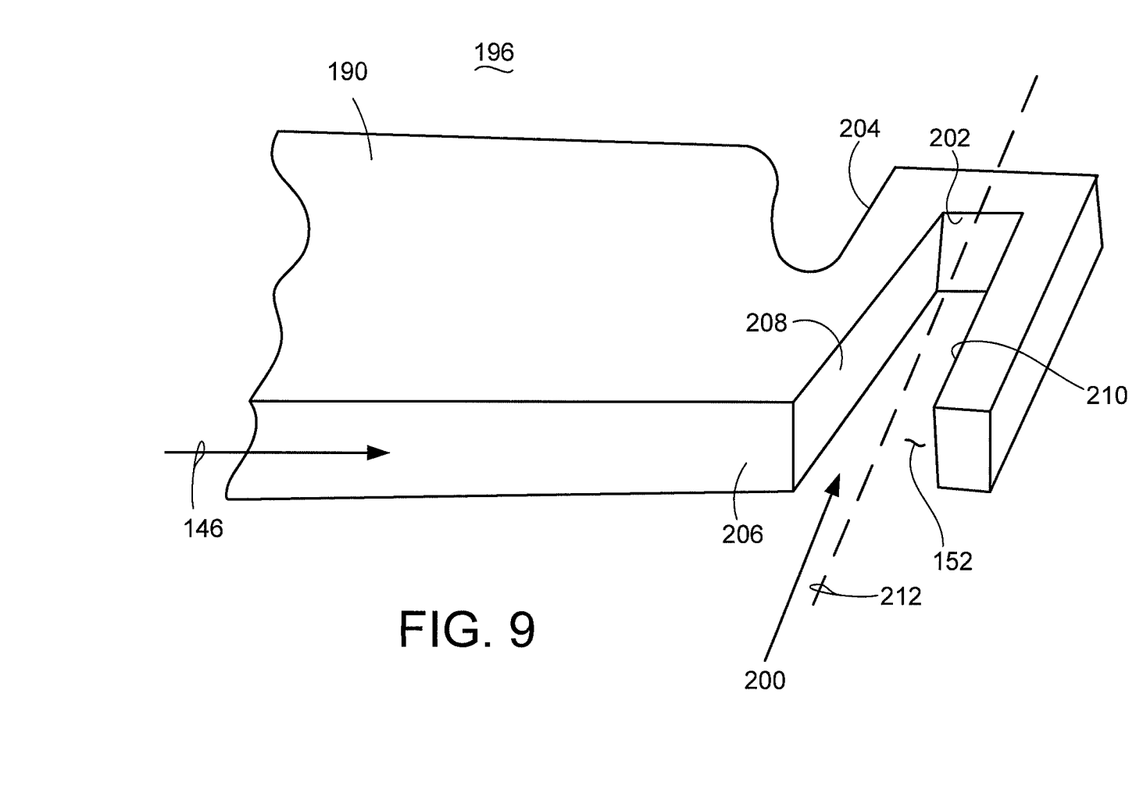
FIG. 9 is an isometric depiction of another one of the cavities in the slider of FIG. 2.

Another cavity (or "vent") 200 is formed in the side rail 190 in the trailing end portion of the slider. FIG. 9 is an enlarged detail view of the cavity 200 that extends into the side rail 190, but which is formed by a closed end 202 such that the cavity 200 does not intersect the surface 204 of the side rail 190 forming part of the negative pressure recess 196. Note that in these embodiments the depth of the cavity 200 is consistently through the entire thickness of the side rail 190, such that the slider surface 152 forms the entire bottom of the cavity 200. However, in equivalent alternative embodiments the cavity can have one or more nonlinear surfaces and be stepped as described above in reference to FIGS. 7 and 8, respectively.

An opposing open end of the cavity 200 intersects another surface 206 of the side rail 190 opposing the surface 204, the surface 204 being nearer the longitudinal axis 148 than the opposing (in these embodiments substantially nonparallel) surface 206. The cavity 200 thereby fluidly communicates with the ambient fluid flowing in direction 146 that is of a comparatively higher pressure than the void created by the fluid flowing past the negative pressure recess 196. The cavity 200 does not fluidly communicate the comparatively lower pressure fluid in the negative pressure recess 196 with the ambient fluid through the side rail 190.

In these illustrative embodiments the cavity 200 is defined by substantially parallel surfaces 208, 210 extending along a central axis 212 angling toward the ambient flow in direction 146 to facilitate introducing the ambient fluid into the cavity 200. However, the claimed invention is not limited to those illustrative embodiments. Again, operational shocks (such as external excitation) alter the pressure profile created by the fluid flow in direction 146 against the ABS 150. The cavity 200 functions to dynamically pressurize the portion of the ABS 150 formed by the side rail 190. That advantageously damps the adverse effects of an operational shock by damping the effect of the shock and preventing a trailing edge roll-off event through increased dynamic roll stiffness. Another advantage is that the damping is active only in response to a shock event and thereby advantageously not adverse to ABS performance otherwise.

Returning to FIG. 2, in these illustrative embodiments an opposing longitudinal side rail 220 on the other side of the longitudinal axis 148 similarly forms another portion of the ABS 150 on the trailing end portion of the slider. The side rail 220 is joined to another lateral cross rail 222 which, in turn, is joined to another longitudinal rail 224. The rails 220, 222, 224 have side surfaces thereof jutting outward from the slider surface 152 to define another negative pressure recess 226, functioning the same as the negative pressure recess 196 discussed above. In equivalent alternative embodiments (not depicted) the side rails 190, 220 could be joined to the same cross rail, each side rail 190, 220 thereby forming different portions of a common negative pressure recess.

Another cavity (or "vent") 228 is formed in the side rail 220 in the trailing edge portion of the slider. Mirroring the cavity 200, the cavity 228 extends into the side rail 220, but is formed by a closed end such that the cavity 228 does not intersect the surface of the side rail 220 forming part of the negative pressure recess 226. However, as clearly depicted in these illustrative embodiments the cavity 228 is longer than the cavity 200, such that the cavities 200, 228 are asymmetrical around the longitudinal axis 148. The depth of the cavity 228, like the cavity 200, can extend entirely through the side rail 220 or can be stepped to have two or more different depths.

An opposing open end of the cavity 228 intersects the outermost surface of the side rail 220. The cavity 200 thereby fluidly communicates with the ambient fluid flowing in direction 146 that is of a comparatively higher pressure than the fluid contained in the negative pressure recess 226. The cavity 200 does not fluidly communicate the comparatively lower pressure fluid in the negative pressure recess 226 with the ambient fluid through the side rail 220.

As discussed above, the cavity 228 is angled toward the ambient fluid flowing in direction 146 to facilitate introducing the ambient fluid into the cavity 228. Again, operational shocks (such as external excitation) alter the pressure profile created by the fluid flow in direction 146 impinging against the ABS 150. The cavity 228 functions to dynamically pressurize the portion of the ABS 150 formed by the side rail 220. That advantageously dynamically responds to the adverse effects of an operational shock, damping the response to a shock to prevent trailing edge roll-off through increased dynamic roll stiffness, and providing increased dynamic roll resistance in loads in negative directions. Another advantage is that the damping is active only in response to a shock event and thereby advantageously not adverse to ABS performance otherwise.

Operational shock performance can be further enhanced by reducing adhesive forces over selected areas of the ABS 150 in conjunction with use of the cavities 168, 200, 228. Adhesive forces act over the large ABS 150 area that is presented as the slider comes closer to the disc 106. These forces increase rapidly with decreasing slider-disc clearance. This can cause a sudden pull-in as the slider gets close to within one to two nanometers from the disc 106. The adhesive forces, in view of the large external loads that occur during an operational shock event, significantly reduces slider clearance making it more likely that unwanted contact between the head 110 and disc 106 can occur.

Figure 10:
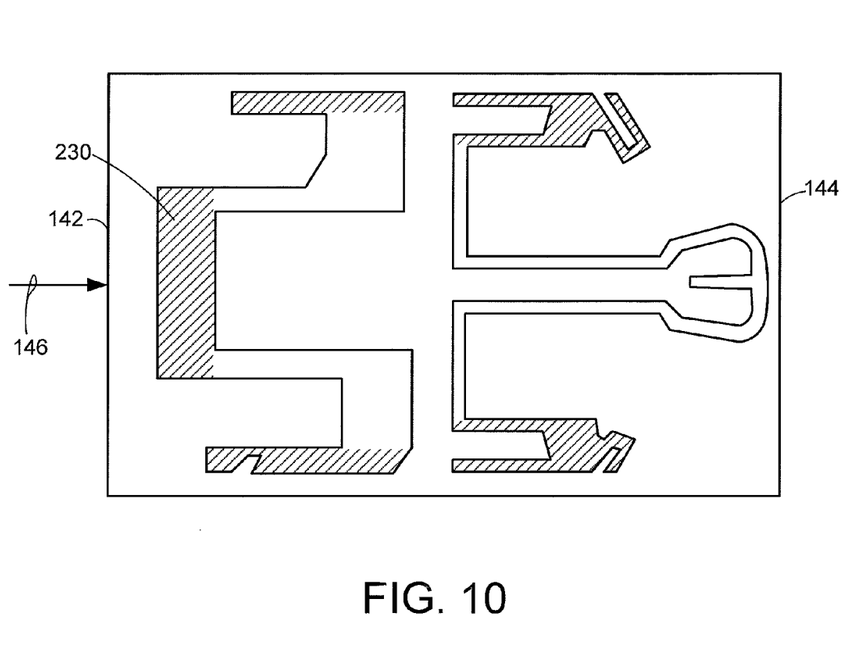
FIG. 10 is a diagrammatic plan view similar to FIG. 2 but depicting areas of the slider that are surface treated to reduce fluid adhesion.

FIG. 10 diagrammatically depicts (by hatching pattern) portions of the ABS 150 to which a selected surface treatment can be applied to reduce the adhesive forces and thereby increase shock robustness in the trailing edge roll-off mode by contributing lower roll torques and pushing the pivot point toward the center pad region, working toward effectively balancing the roll torque and the pitch torque moments. The surface treatment can include applying a suitable surface coating to reduce the effective surface energy and reduce wettability of the surface by the disc lubricant, and/or increasing the surface roughness such as by texturing and the like.

Figure 11:
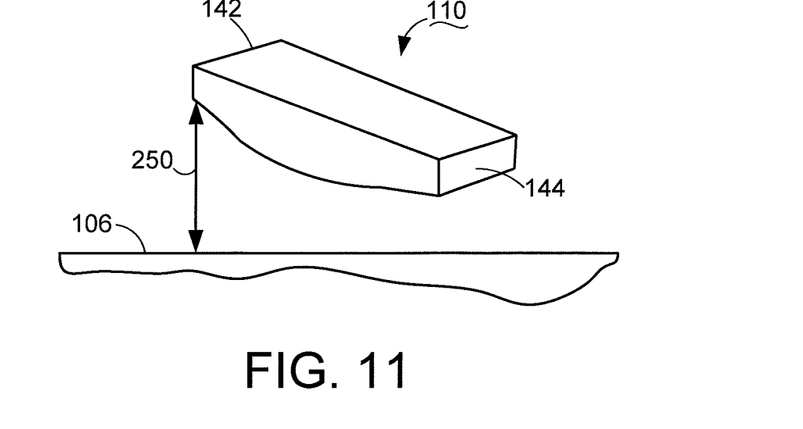
FIG. 11 diagrammatically depicts the slider having a significant crown shape.

FIG. 11 diagrammatically depicts an increased crown of the slider, resulting in gains in the leading edge clearance margin 250 between the slider and the disc 106. Increased clearance at the leading edge prevents failures due to a leading edge slap-down that occurs during a negative cycle of operational shock loads and thus increases the operational shock threshold. Increasing the clearance also results in lower adhesive forces on the portions of the slider closest to the leading edge 142, thus reducing the propensity for adhesion induced leading edge 142 slap-down during a shock event.

Figure 12:
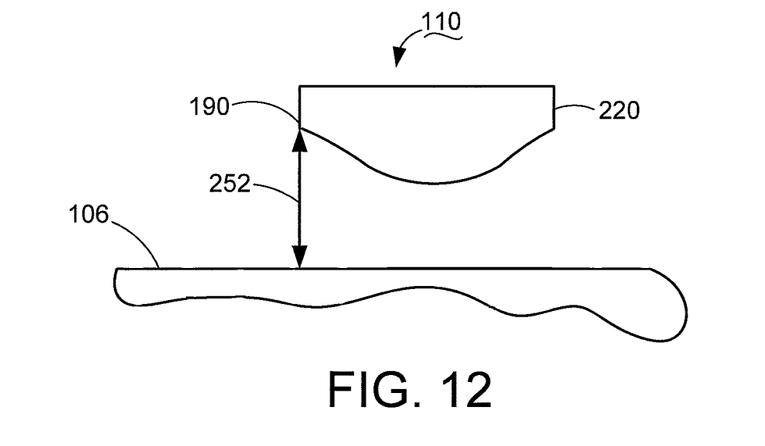
FIG. 12 diagrammatically depicts the slider having a significant cross curve shape.

FIG. 12 diagrammatically depicts an increased cross-curve slider, resulting in gains in the slider-disc clearance margin 252 at the trailing edge side rails 190, 220. Increased clearance at the trailing edge side rails 190, 220 prevents failures due to a trailing edge roll-off that occurs during a positive cycle of operational shock loads and thus increases the operational shock threshold. Increasing the clearance also results in lower adhesive forces on the side rail portions 190, 220 of the slider, thus reducing the propensity for adhesion induced trailing edge side rail roll-off during a shock event.

By incorporating one or more of the cavities, the reduction of adhesive forces, increased crown, and increased cross-curve as described herein, operational shock performance can be improved over that of the baseline performance, thus improving the reliability of the disc drive.

It is to be understood that even though numerous characteristics and advantages of various aspects have been set forth in the foregoing description, together with details of the structure and function, this disclosure is illustrative only, and changes may be made in detail, especially in matters of structure and arrangement to the full extent indicated by the broad general meaning of the terms in which the appended claims are expressed.

What is claimed:

1. An apparatus comprising:
   a slider body defining longitudinal extents at a leading end and a trailing end;
   a side rail extending substantially longitudinally along the slider body and joined to a cross rail extending substantially laterally along the slider body, the side rail and the cross rail defining a positive fluid pressure inside the side rail and ambient fluid pressure outside the side rail; and
   a cavity in the side rail that does fluidly communicate with the ambient fluid pressure outside the side rail but does not fluidly communicate with the positive fluid pressure inside the side rail, the cavity angled toward oncoming ambient fluid flow.

2. The apparatus of claim 1 wherein the cavity is in the rail between the leading edge and a midpoint between the leading edge and the trailing edge.

3. The apparatus of claim 1 wherein the side rail is characterized as a first side rail and the cross rail is characterized as a first cross rail, the apparatus comprising:
   a second side rail extending substantially longitudinally along the slider body and joined to a second cross rail extending substantially laterally along the slider body, the second side rail and the second cross rail defining a negative fluid pressure inside the second side rail and the ambient fluid pressure outside the second side rail; and
   a second cavity in the second side rail that does fluidly communicate with the ambient fluid pressure outside the second side rail but does not fluidly communicate with the negative fluid pressure inside the second side rail.

4. The apparatus of claim 3 wherein the second cavity is in the second rail between the trailing edge and a midpoint between the leading edge and the trailing edge.

5. The apparatus of claim 3 comprising:
   a third side rail opposing the second side rail around the longitudinal axis of the slider, the third side rail extending substantially longitudinally along the slider body and joined to a third cross rail extending substantially laterally along the slider body, the third side rail and the third cross rail defining another negative fluid pressure inside the third side rail and the ambient fluid pressure outside the third side rail; and
   a third cavity in the third side rail that does fluidly communicate with the ambient fluid pressure outside the third side rail but does not fluidly communicate with the negative fluid pressure inside the third side rail.

6. The apparatus of claim 5 wherein the third cavity is in the third rail between the trailing edge and a midpoint between the leading edge and the trailing edge.

7. The apparatus of claim 5 wherein the second and third cavities are asymmetrical around the longitudinal axis of the slider body.

8. The apparatus of claim 5 wherein the second and third vents are asymmetrical around the longitudinal axis of the slider body.

9. The apparatus of claim 5 wherein the second and third cavities are angled toward the oncoming ambient fluid flow.

10. The apparatus of claim 1 wherein the cavity is defined by non-parallel surfaces opposing each other along a first central axis.

11. The apparatus of claim 1 wherein the cavity is defined by opposing surfaces extending along a first central axis, at least a portion of at least one of the opposing surfaces being nonlinear.

12. The apparatus of claim 1 wherein the cavity defines two or more different depths.

13. A method comprising:
   obtaining a slider having a slider body defining longitudinal extents at a leading end and a trailing end, the slider further having a side rail extending substantially longitudinally along the slider body and joined to a cross rail extending substantially laterally along the slider body, the side rail and the cross rail defining a positive fluid pressure inside the side rail and ambient fluid pressure outside the side rail, and the slider having a cavity in the side rail that does fluidly communicate with the ambient fluid pressure outside the side rail but does not fluidly communicate with the positive fluid pressure inside the side rail, the cavity angled toward oncoming ambient fluid flow; and flying the slider apart from a medium upon fluid currents created by moving the medium.

14. An apparatus comprising:
a slider body defining longitudinal extents at a leading end and a trailing end;
a fluid bearing surface formed in part by a side rail extending substantially longitudinally along the slider body and joined to a cross rail extending substantially laterally along the slider body, the side rail and cross rail defining of a positive pressure recess; and
a vent defined in the fluid-bearing surface that is in fluid communication with ambient pressure fluid on one side of the side rail but is not in fluid communication with the positive pressure recess on the other side of the side rail, the vent angled toward oncoming ambient fluid flow.

15. The apparatus of claim 14 wherein the fluid bearing surface is formed in part by a second side rail extending substantially longitudinally along the slider body and joined to a second cross rail extending substantially laterally along the slider body, the second side rail and the second cross rail defining a negative pressure recess, the apparatus comprising a second vent defined in the fluid bearing surface that is in fluid communication with ambient pressure fluid on one side of the second side rail but is not in fluid communication with the negative pressure recess on the other side of the second side rail.

16. The apparatus of claim 15 wherein the fluid bearing surface is formed in part by a third side rail opposing the second side rail around the longitudinal axis of the slider, the third side rail extending substantially longitudinally along the slider body and joined to a third cross rail extending substantially laterally along the slider body, the third side rail and third cross rail defining another negative pressure recess, the apparatus comprising a third vent defined in the fluid bearing surface that is in fluid communication with ambient pressure fluid on one side of the third side rail but is not in fluid communication with the another negative pressure recess on the other side of the third side rail.

17. The apparatus of claim 16 wherein the second and third vents are angled toward the oncoming ambient fluid flow.

18. The apparatus of claim 14 wherein the vent is defined by non-parallel surfaces opposing each other along a first central axis.

19. The apparatus of claim 14 wherein the vent is defined by opposing surfaces extending along a first central axis, at least a portion of at least one of the opposing surfaces being nonlinear.

20. The apparatus of claim 14 wherein the vent is defined by two or more different depths.

* * * * *